United States Patent [19]

Oldendorf et al.

[11] Patent Number: 4,688,898

[45] Date of Patent: Aug. 25, 1987

[54] LCD DISPLAY BOARD FOR AN ELECTRONIC BALANCE

[75] Inventors: Christian Oldendorf, Göttingen; Franz-Josef Melcher, Hardegsen; Erich Knothe, Bovenden, all of Fed. Rep. of Germany

[73] Assignee: Sartorius GmbH, Fed. Rep. of Germany

[21] Appl. No.: 697,882

[22] Filed: Feb. 4, 1985

[30] Foreign Application Priority Data

Feb. 11, 1984 [DE] Fed. Rep. of Germany ....... 3404926

[51] Int. Cl.⁴ .............................................. G02F 1/13
[52] U.S. Cl. ................................ 350/336; 350/331 R; 350/332
[58] Field of Search .................. 350/331 R, 332, 335, 350/336

[56] References Cited

U.S. PATENT DOCUMENTS 4,110,967  9/1978  Fujita ............................. 350/332 X
4,194,833  3/1980  Lester et al. ................ 350/331 R X
4,380,371  4/1983  Frantz .................... 350/336
4,423,929  1/1984  Gomi ............................. 350/332 X
4,443,062  4/1984  Togashi et al. ..................... 350/332

Primary Examiner—John K. Corbin
Assistant Examiner—Richard F. Gallivan
Attorney, Agent, or Firm—Eric P. Schellin

[57] ABSTRACT

LCD display boards for electronic balances frequently also comprise, alongside the digits for the digital display of the weighing result, additional fields in which additional information is displayed by means of alphanumeric signs. The invention suggests that the segments of the digits for displaying the weighing result be individually provided with a line and controlled in parallel in order to achieve a very good display quality and that the segments for the display of the alphanumeric signs of the additional field, e.g. a 5×7 matrix, be connected in such a manner that they can be serially controlled in order to prevent the number of lines required from becoming too great.

8 Claims, 3 Drawing Figures

LCD DISPLAY BOARD FOR AN ELECTRONIC BALANCE

BACKGROUND OF THE INVENTION

The invention is relative to an LCD display board for an electronic balance with digits composed of segments for displaying the weighing result and with an additional field in which additional information for the user is displayed by means of alphanumeric signs composed of segments.

FIELD OF THE INVENTION

Display boards of this type are well known. If a good contrast and a wide angle of observation are desired in them, all segments must be controlled constantly, i.e., in parallel. However, this results for many digits and signs to be displayed in a very large number of leads and connections. If, for example, 6 digits are to be displayed in a 7 segment arrangement and 16 signs in a 5×7 point matrix, over 600 leads are necessary. If this large number of leads and contact points is to be avoided, one must go from a static operation to a multiplex operation and control the different signs serially. In this case only 6+9+7+85=107 leads would be required in the example just mentioned. However, this results in a loss of contrast and a smaller possible angle of observation.

SUMMARY OF THE INVENTION

The invention has the task of creating a LCD display board of the type indicated above in which the specified disadvantages of parallel and serial control occur as little as possible.

This is achieved by the invention as follows: The segments of the digits for displaying the weighing result are individually provided with a lead and can be controlled in parallel, and the segments for the alphanumeric signs of the additional field are connected to one another inside the display board in such a manner that they can be serially controlled in a known manner.

Thus, the important, frequently changing information, namely, the digital weighing result, can be displayed with good contrast and is easy to read. The entailed expense for the leads to each individual segment is accepted as part of the bargain. The additional information, which changes less frequently, and usually only after one of the operating keys is actuated, is serially controlled in multiplex operation. A poorer display quality is accepted for this information. 6×9+3+7+85=149 leads are required in the example above and in the partially parallel, partially serial control suggested. That is, a reduction to less than ¼.

The subclaims contain advantageous embodiments of the invention.

BRIEF DESCRIPTION OF THE DRAWING

The invention is described below with reference made to the drawings.

DETAILED DESCRIPTION OF THE PREFERRED EMBODIMENTS

Figure 1:
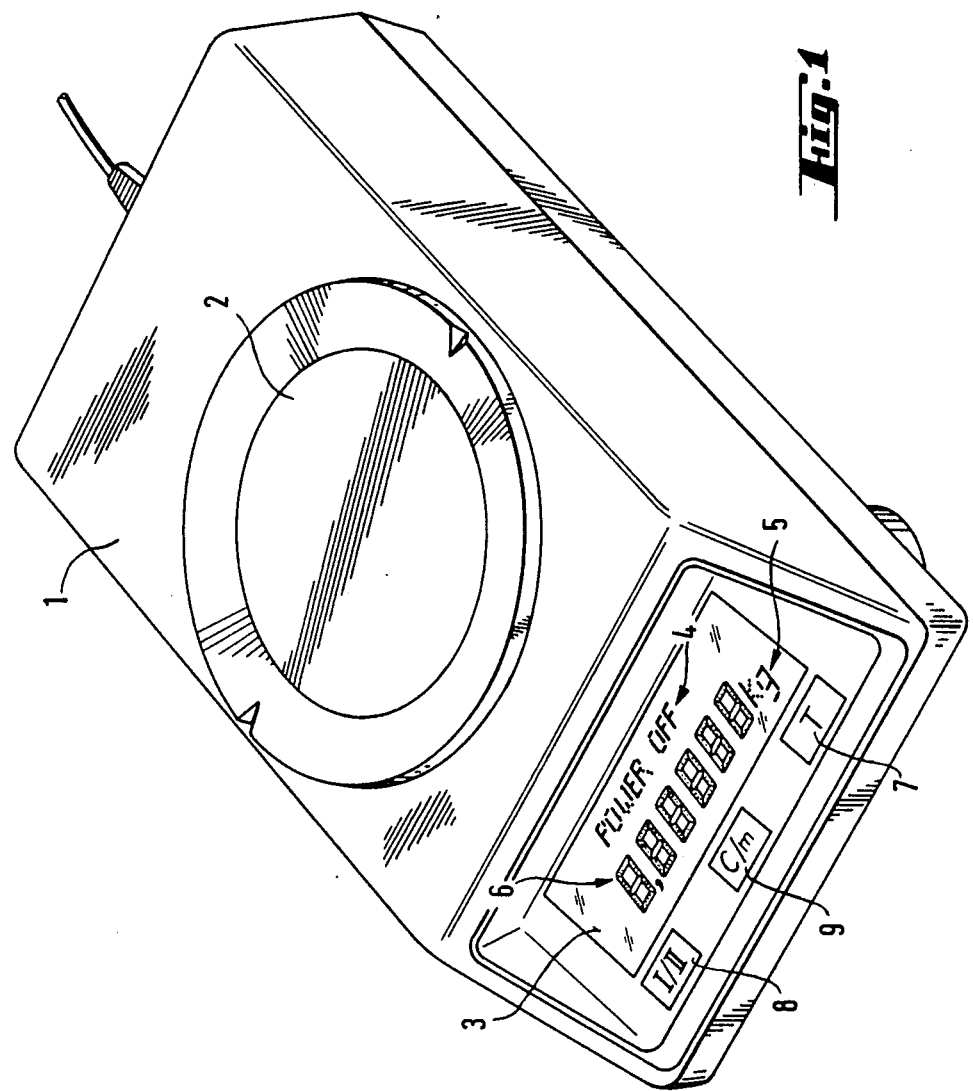
FIG. 1 shows a perspective view of an electronic balance with LCD display board.

FIG. 1 shows housing 1 and weighing scale 2 for receiving the material to be weighed, which constitutes parts of the electronic balance. The actual measuring system of the balance can operate according to any method which furnishes a digital or digitizable measured result. Customary methods are, for example, wire strain gauges on transverse beams, or the electromagnetic compensation of force or oscillating strings. The measured result is displayed on LCD display board 3 by digits 6 composed of segments. Alphanumeric signs 5 for indicating the unit of measurement and other alphanumeric signs 4 for additional information can be displayed on display board 3 alongside the digital display mentioned above. This additional information can contain, for example, data about the balance program just used, such as, for example, "counting weigher", or it guides the user, i.e. it contains instructions such as "put on 10 pieces" when initializing a counting weigher program, or it contains indications about the exceeding of limiting values, e.g. "overflow". FIG. 1 also shows operating keys 7, 8 and 9, which are used in a customary manner for taring, range change, etc.

Figure 2:
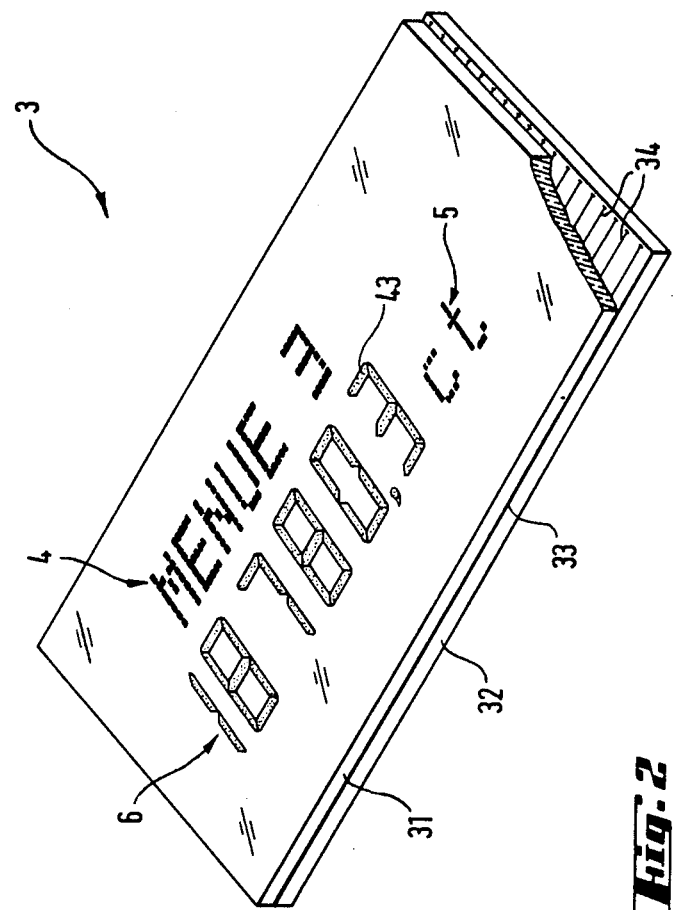
FIG. 2 shows a perspective view of the display board with partially omitted upper glass plate.

FIG. 2 shows LCD display board 3 once again by itself. It consists of front plate 31 and back plate 32, between which thin liquid crystal layer 33 is located. In FIG. 2 this liquid crystal layer is indicated only by a rather thick dividing line between the two glass plates on account of its slight thickness. The control of the optical permeability of liquid crystal layer 33 occurs in a known manner by segmentlike thin electrodes on the bottom of front plate 31 and by counterelectrodes on the top of back plate 32. The electrodes which form the 7 segments of the digits and 2 segments of the decimal point and comma are individually brought out for all digits 6 for displaying the weighing result and the counterelectrode surrounds this section in an area. This makes it possible for the segments of the digits, decimal points, commas and special signs +/−/0 to be controlled in parallel, resulting in a good contrast.

Figure 3:
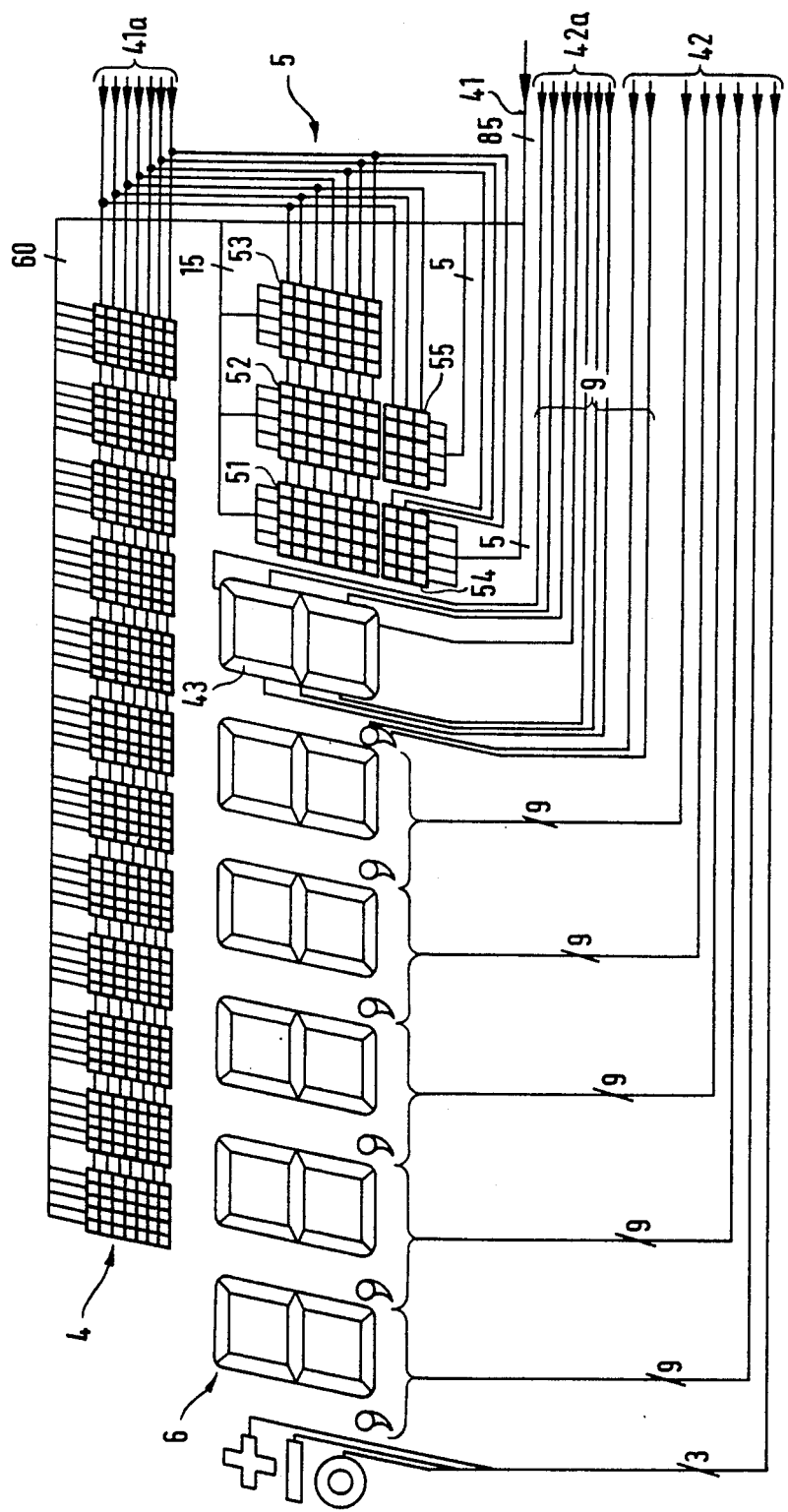
FIG. 3 shows the display board with its segments in a top view.

Alphanumeric signs 4 and 5 for the additional information are constructed from 5×7 matrices (see FIG. 3). The points of the matrices are formed by the electrode layer on the back side of front plate 31 and the vertical points of all matrices are connected to each other electrically, as is sketched in by way of example in FIG. 3 for the upper right matrix point. Thus, there are 85 columns in FIG. 3. The counterelectrode on the top of back disk 32 is subdivided into individual partial areas, whereby each partial area precisely covers one line of all matrices. 7 lines result from the 5×7 matrix (FIG. 3). This makes it possible for the individual alphanumeric signs of the additional field to be serially controlled in a known manner. This results in a drastic reduction of the number of leads required on the display board.

Of these leads, only a few leads 34 to the counterelectrodes on the top of back glass plate 32 are shown in FIG. 2. In FIG. 3 leads 41 for all columns and 41a for all lines of the counterelectrode are characterized by way of example. The control of the 7 segments as well as the decimal point and comma of digit display 6 is characterized by lead 42 and the control of the last digits 43 by 42a.

FIG. 3 also shows how the additional field is subdivided into two partial sections 4 and 5. Partial section 4 located above digits 6 for displaying the weighing result consists in this example of 12 adjacent 5×7 matrices for the simultaneous display of any 12 alphanumeric signs. The other partial section 5 is located to the right of digits 6 for displaying the weighing result and displays the unit of measurement of the weighing result. Partial section 5 consists of three normal 5×7 matrices 51, 52 and 53 and two "semi" matrices 54 and 55 located under the first two matrices 51 and 52. Each of these semimatrices consists of 5×3 matrix points and displays short lengths for the first two signs 51 and 52. Such short lengths are advantageous, for example, for displaying "g" as a gram symbol. The two "semi" matrices 54 and 55 are controlled by the microprocessor for controlling the display together like a normal 5×7 matrix (with a missing line). Thus, the two partial sections of the additional field comprise in this example a total of 16 signs which are advantageously all controlled together serially at a keying ratio of 1:8 due to the 5×7 matrix.

Other geometric arrangements for the digits for displaying the weighing result and for the additional field are of course possible. For example, the additional field can be located under the digits for displaying the weighing result, or, the alphanumeric signs can be displayed by a 7×9 matrix in order to make possible a finer display. The matrices of partial section 5 for displaying the unit of measurement can also be selected to be larger than the matrices of partial section 4, e.g. just as large as digits 6 for displaying the measuring result. Likewise, the number of matrices can be varied according to need, which logically results in other keying ratios in their serial control. Even a different composition of the matrix points in serial control can of course be selected.

We claim:

1. LCD display board for an electronic balance with digits composed of segments for displaying the weighing result, whereby the segments of the digits are individually connected to a supply line and can be controlled in parallel, and with an additional field in which additional information for the user can be displayed by means of alphanumeric characters composed of segments of a matrix, whereby the individual segments are connected to each other in such a manner that they can be serially controlled, characterized in that the additional field is located on the right, adjacent to the digits for displaying the weighing result, and that the additional field comprises at least four matrices of which three are located adjacent to one another in their normal matrix form and of which the fourth matrix is divided into two halves and each of these halves is located under the first two matrices for displaying two characters so that descenders can also be shown for the two characters.

2. LCD display board according to claim 1, characterized in that the additional field displays the unit of measure of the weighing result.

3. LCD display board according to one of claim 1 or 2 characterized in that another additional field is located above the digits for displaying the weighing result.

4. LCD display board according to claim 3 characterized in that the two additional fields comprises a total of 16 matrices and are serially controlled with a pulse duty factor of 1:8.

5. LCD display board according to claim 3 characterized in that the alphanumeric characters of the additional field or of the additional fields are composed of segments of a 5×7 matrix.

6. LCD display board according to claim 3 characterized in that the alphanumeric characters of the additional field or of the additional fields are composed of segments of a 7×9 matrix.

7. LCD display board according to one of claims 1 or 2 characterized in that the alphanumeric characters of the additional field or of the additional fields are composed of segments of 5×7 matrix.

8. LCD display board according to one of claim 1 or 2, characterized in that the alphanumeric characters of the additional field or of the additional fields are composed of segments of a 7×9 matrix.

* * * * *